United States Patent
Wu et al.

(10) Patent No.: US 12,169,480 B2
(45) Date of Patent: Dec. 17, 2024

(54) SYSTEM TO SUPPORT NATIVE STORAGE OF A CONTAINER IMAGE ON A HOST OPERATING SYSTEM FOR A CONTAINER RUNNING IN A VIRTUAL MACHINE

(71) Applicant: VMware LLC, Palo Alto, CA (US)

(72) Inventors: Junfei Wu, Beijing (CN); Xiaodong Ye, Beijing (CN)

(73) Assignee: VMware LLC, Palo Alto, CA (US)

( * ) Notice: Subject to any disclaimer, the term of this patent is extended or adjusted under 35 U.S.C. 154(b) by 842 days.

(21) Appl. No.: 17/017,288

(22) Filed: Sep. 10, 2020

(65) Prior Publication Data

US 2022/0075760 A1 Mar. 10, 2022

(51) Int. Cl.
*G06F 16/188* (2019.01)
*G06F 9/455* (2018.01)
*G06F 16/13* (2019.01)

(52) U.S. Cl.
CPC ........ *G06F 16/188* (2019.01); *G06F 9/45558* (2013.01); *G06F 16/137* (2019.01); *G06F 2009/45583* (2013.01)

(58) Field of Classification Search
None
See application file for complete search history.

(56) References Cited

U.S. PATENT DOCUMENTS

| | | | |
|---|---|---|---|
| 2018/0332108 A1* | 11/2018 | Simek | H04L 63/062 |
| 2018/0349150 A1* | 12/2018 | Wong | G06F 9/4493 |
| 2020/0019624 A1* | 1/2020 | Barnett | G06F 16/119 |
| 2020/0218529 A1* | 7/2020 | Cheng | G06F 8/65 |

* cited by examiner

*Primary Examiner* — Thu N Nguyen
(74) *Attorney, Agent, or Firm* — King Intellectual Asset Management

(57) ABSTRACT

Described herein are a system and method for forming a container image. The system and method include obtaining a first layer of a plurality of layers of the container image. The contents of the first layer are stored in a directory such that a first disk image layer file is mounted to the directory. A second layer of the plurality of layers is obtained, and the contents of the second layer are stored in the directory so that the first disk image layer includes contents of the first layer and the second layer. The first disk image layer is saved and is mountable and includes files of the container image.

17 Claims, 9 Drawing Sheets

SYSTEM TO SUPPORT NATIVE STORAGE OF A CONTAINER IMAGE ON A HOST OPERATING SYSTEM FOR A CONTAINER RUNNING IN A VIRTUAL MACHINE

BACKGROUND

Containers are virtualizations of an operating system in which a portion of the resources over which the operating system has control, such as namespaces, control groups, and file systems, is used to form an isolated environment in which an image of an application program runs. For example, a physical host computer system may run an operating system (referred to as a host operating system), and a container running directly on the host computer system may be a virtualization of the host operating system.

In some designs, a host computer system can support one or more virtual machines that run on the host computer system. Further, a container, instead of running directly on the host computer system, may run within a virtual machine. For example, the virtual machine may run an operating system (referred to as a guest operating system), and the container may be a virtualization of the guest operating system. In some such cases, while the container itself runs in the virtual machine, a container runtime, which manages the container (e.g., fetches the container image to execute in the container, configures the system to run the container, etc.), may run directly/natively on the host operating system of the physical host computer system.

The container image may be used to create an executable image (e.g., corresponding to one or more applications) that executes in the container. In certain aspects, the container image is delivered as a tar file. In certain aspects, the container image contains one or more layers, each of which includes a set of files. Further, in certain aspects, the layers have an ordering, where a base layer includes a base set of files, and subsequent layers (e.g., upper layers) include additional sets of files. Files from higher layers may overwrite files from lower layers when the upper layer file is an update of a lower layer file.

In certain aspects, each layer is stored in a hash-named directory so that it is content addressable. An index contains a manifest that points to the hash-named directories for each layer and the manifest contains a configuration field that refers to the set of layers needed to build a runtime image. Each of the upper layers is difference layer over the previous layer, and each is combined in succession, starting with the base layer to create an executable image for the container.

A container image is pulled from storage, so that it can execute in a container, such as a container in a virtual machine. A container image can further be pushed to storage to store the container image. For example, a container image may change based on the execution of the container, and the changed container image may be pushed to storage for later execution. Accordingly, a typical workflow executed by a container runtime for managing a container corresponding to a container image includes: 1) pulling from storage the container image, extracting the one or more directories from the container image and extracting a layer from each directory); 2) storing the layers in separate folders (e.g., where each layer is a difference layer over the previous layer, and each layer has its own folder); and 3) union mounting the folders for each layer to get a combined folder, which can be added to the root file system of the container for access by the container.

As discussed, the container runtime can run on the host operating system. Therefore, in order to support the typical workflow of the container runtime, the host operating system needs to support a combining operation, such as a union mount operation, to combine the folders of the layers of the container image. However, some operating systems do not support a union mount operation for combining the layers of the image. One such operating system is the MAC operating system (MAC OS).

Further, some operating systems have a file system that is not case-sensitive (e.g., MAC OS). However, the file system of the container managed by the container runtime is case sensitive. Therefore, storing files of the container on the file system of the host operating system directly may result in lost files when the files have the same case-insensitive name (i.e., same name but different case).

SUMMARY

Embodiments provide a method for forming a container image. The method includes obtaining a first layer of a plurality of layers of the container image, storing contents of the first layer into a directory, where a first disk image layer file is mounted to the directory, obtaining a second layer of the plurality of layers, storing contents of the second layer into the directory so that the first disk image layer file includes the contents of the first layer and the second layer, and saving the first disk image layer file, where the first disk image layer file is mountable and includes files of the container image.

Further embodiments include a computer-readable medium containing instructions that, when executed by a computing device, cause the computing device to carry out one more aspects of the above method, and a system comprising memory and a processor configured to carry out one or more aspects of the above method.

DETAILED DESCRIPTION

Figure 1:
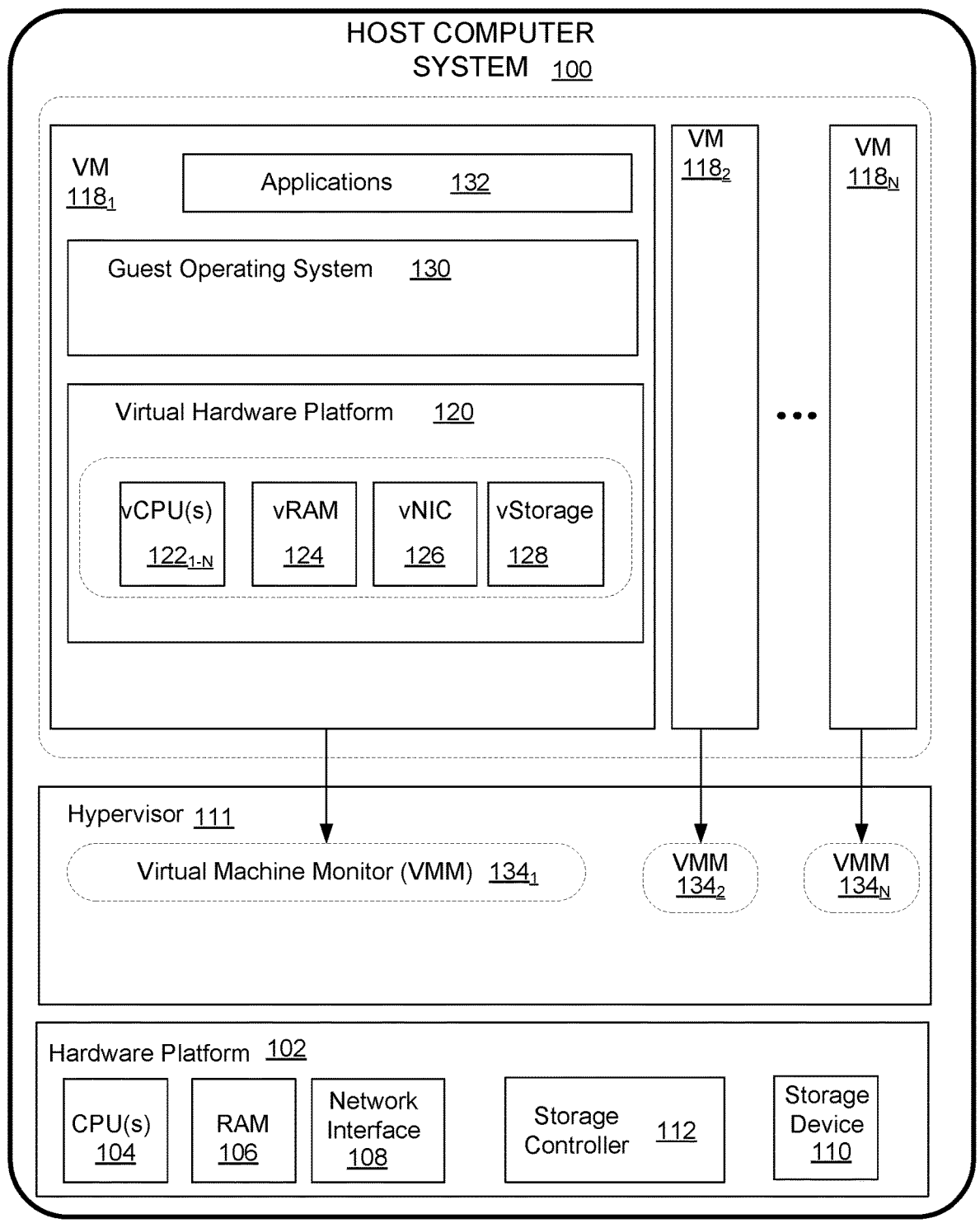
FIG. 1 depicts a host computer system.

Embodiments described herein include a system and method for supporting native storage of a container image on a host operating system for a container running in a virtual machine that is managed by a container runtime operating on the host operating system. In particular, embodiments described herein can be used for operating systems that use a case-insensitive file system even for containers images having case-sensitive files. Further, embodiments described herein can be used for operating systems that do not support a union mount operation. Certain aspects are described herein with respect to MAC OS as the host operating system, and functions specific to MAC OS are discussed and described. However, it should be noted that the techniques herein may similarly be used with other suitable operating systems, such as using other functions that have similar functionality, but may be referred to by different names.

Certain embodiments provide systems and methods for utilizing a disk image file to store files for executing a container. The disk image file supports case-sensitive file names, and disk image files can be combined in a temporary mount directory. In certain embodiments, the disk image file is an Apple Disk Image file and referred to as a dmg file. In some embodiments, a dmg file, as used herein, may be a sparse dmg file whose size adjusts to the size of the file. Though certain techniques are described with respect to a dmg file, as noted, the techniques may similarly be applied to other suitable types of disk image files supporting other suitable functions provided by the host operating system.

In certain embodiments, to execute a container, the container runtime is configured to: 1) create a dmg layer file, corresponding to a dmg file to include the files of one or more layers of a container image (more generally referred to as a disk image layer file; 2) set a property of the dmg layer file to case-sensitive; 3) mount the dmg layer file in a directory of the file system; and 4) store files for executing the container in the directory, thereby modifying the dmg layer file to include files for executing the container in the dmg layer file. In particular, to store the files for executing the container in the mounted directory, container runtime pulls a container image corresponding to the container from storage (e.g., downloads) and extracts from the container image a plurality of layers. For the first layer, the container runtime creates a first dmg layer file and mounts the first dmg layer file to the directory in the file system. The container runtime then stores the files for the first layer in the mounted directory. Thus, the first dmg layer file includes the files for the first layer. In certain embodiments, the container runtime then duplicates/creates a copy of the first dmg layer file. For example, the copied first dmg layer file can then later be used to build a different container that includes the same first layer, but different subsequent layers without needing to rebuild the first dmg layer file. The container runtime then mounts (if not already mounted) the first dmg layer file (e.g., the original or the copy) to the directory (e.g., the same or another directory). The container runtime then stores the files for the next layer in the mounted directory. Thus, the first dmg layer file now includes the files for the first layer and the next layer, and may now be referred to as the second dmg layer file (as compared to the copy of the first dmg layer file that includes only the files of the first layer). These steps repeat for each next layer until a complete image is built if there are additional layers. The final dmg layer file is then mounted as the root file system for the container. Since the final dmg layer file is a mounted case-sensitive dmg layer file, it is both case-sensitive and achieves the goal of having all the layer files combined to execute the container. Alternatively, all of the files of all of the layers of the container image can be accumulated in the same directory without saving (e.g., duplicating) to create as single dmg layer file as the final dmg layer file. In this alternative, the intermediate dmg layer files are not available. In some embodiments, only one or more of the intermediate dmg layer files may be duplicated and saved to be later available.

FIG. 1 depicts a block diagram of a host computer system 100 that is representative of a virtualized computer architecture. As is illustrated, host computer system 100 supports multiple virtual machines (VMs) 118₁-118N, which are an example of virtual computing instances that run on and share a common hardware platform 102. Hardware platform 102 includes conventional computer hardware components, such as random access memory (RAM) 106, one or more network interfaces 108, storage controller 112, persistent storage device 110, and one or more central processing units (CPUs) 104. Central processing units 104 may include processing units having multiple cores.

A virtualization software layer, hereinafter referred to as a hypervisor 111, is installed on top of hardware platform 102. Hypervisor 111 makes possible the concurrent instantiation and execution of one or more virtual computing instances such as VMs 118₁-118N. The interaction of a VM 118 with hypervisor 111 is facilitated by the virtual machine monitors (VMNIs) 134₁-134N. Each VMM 134₁-134N is assigned to and monitors a corresponding VM 118₁-118N. In one embodiment, hypervisor 111 may be a VMkernel™ which is implemented as a commercial product in VMware's vSphere® virtualization product available from VMware™ Inc. of Palo Alto, CA In an alternative embodiment, hypervisor 111 runs on top of a host operating system, which itself runs on hardware platform 102. In such an embodiment, depicted in FIG. 2, hypervisor 111 operates above an abstraction level provided by the host operating system 202.

After instantiation, each VM 118₁-118N encapsulates a virtual hardware platform 120 that is executed under the control of hypervisor 111. Virtual hardware platform 120 of VM 118₁, for example, includes but is not limited to such virtual devices as one or more virtual CPUs (vCPUs) 122₁-122N, a virtual random access memory (vRAM) 124, a virtual network interface adapter (vNIC) 126, and virtual storage (vStorage) 128. Virtual hardware platform 120 supports the installation of a guest operating system (guest OS) 130, which is capable of executing applications 132. Examples of guest OS 130 include any of the well-known operating systems, such as the Microsoft Windows™ operating system, the Linux™ operating system, MAC OS, and the like.

Figure 2:
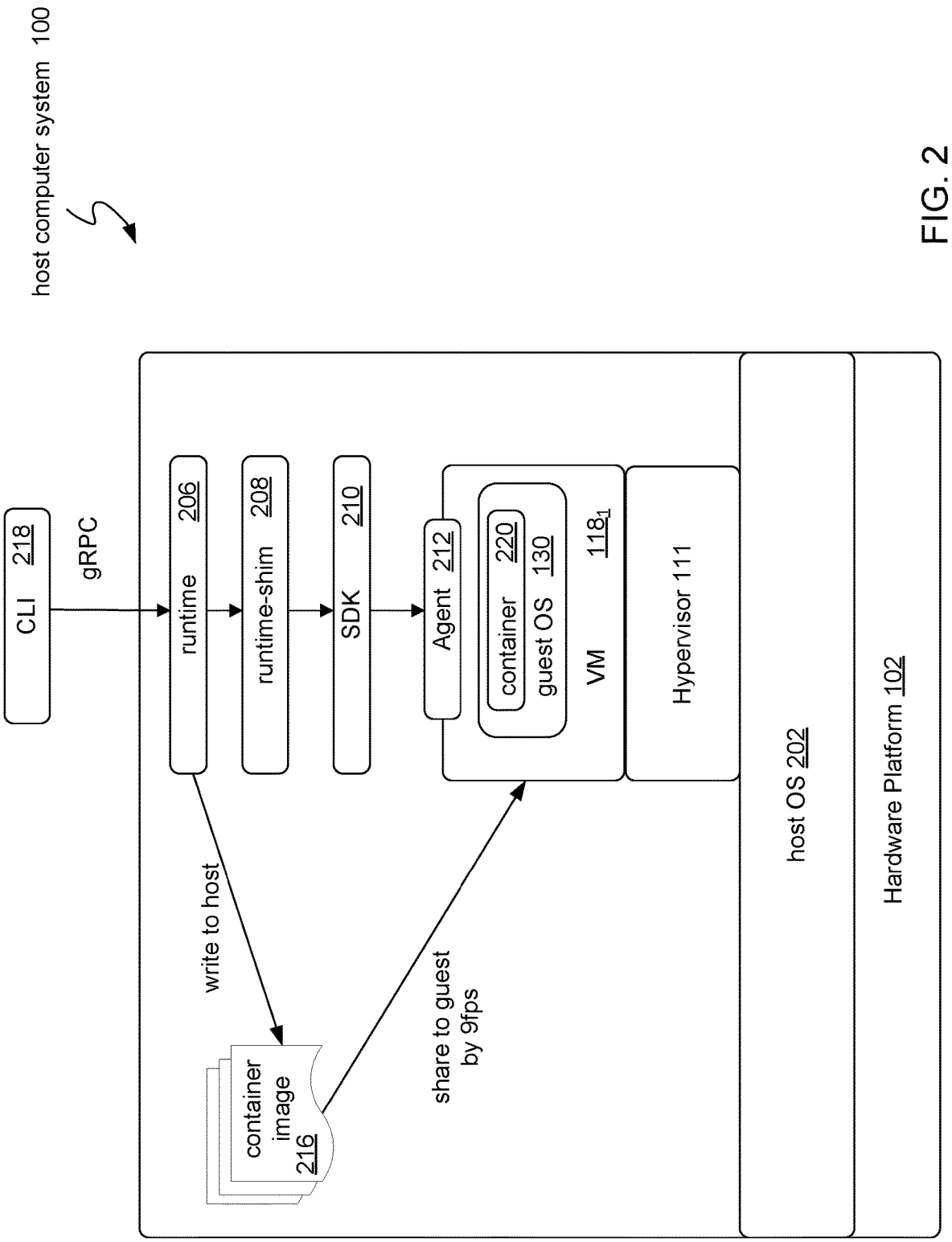
FIG. 2 depicts a configuration for running a container in a virtual machine.

FIG. 2 depicts a configuration for running a container in a virtual machine 118₁ that runs on a host computer system 100, in an embodiment. In the configuration depicted, the host computer system 100 includes hardware platform 102 and hypervisor 111, which runs a virtual machine 118₁, which in turn runs a guest operating system 130, such as the Linux operating system. The virtual machine 118₁ has an interface agent 212 that is coupled to a software development kit (SDK) 210, which in turn, is coupled to a container runtime-shim 208. A container runtime 206, running on the host operating system 202 is coupled between the container runtime-shim 208 and a command-line interface (CLI) 218 via a remote procedure call (RPC). In one embodiment, the virtual machine 118₁ is a light-weight VM that is customized to run containers.

SDK 210 is a wrapper for the VM 118₁ and provides language support for interacting with the VM 118₁.

Container runtime-shim 208 is a process that becomes a parent process for container 220 when container 220 is created.

Container runtime 206 is the process that manages the life cycle of the container 220. In particular, container runtime 206 fetches a container image 216 when requested by the CLI 218. In some embodiments, container runtime 206 is a Docker® containerd.

The RPC, such as gRPC, performs two-way authentication of the CLI 218 and the container runtime 206 and encodes data transferred between container runtime 206 and CLI 218.

In certain embodiments, to standardize the storing of images (e.g., container images), the Open Container Initiative (OCI) sets out an image specification. The image specification describes an archive format of container images which are unpacked to create a bundle meeting a runtime specification, also specified by the OCI. In certain embodiments, a container image includes a directory of hash-named directories (corresponding to layers), an index, and a layout. OCI also sets out the requirements for creating a runtime bundle (corresponding to an executable image), which is formed from the hash-named directories and configuration information and is the item actually run by the container.

Figure 3A:
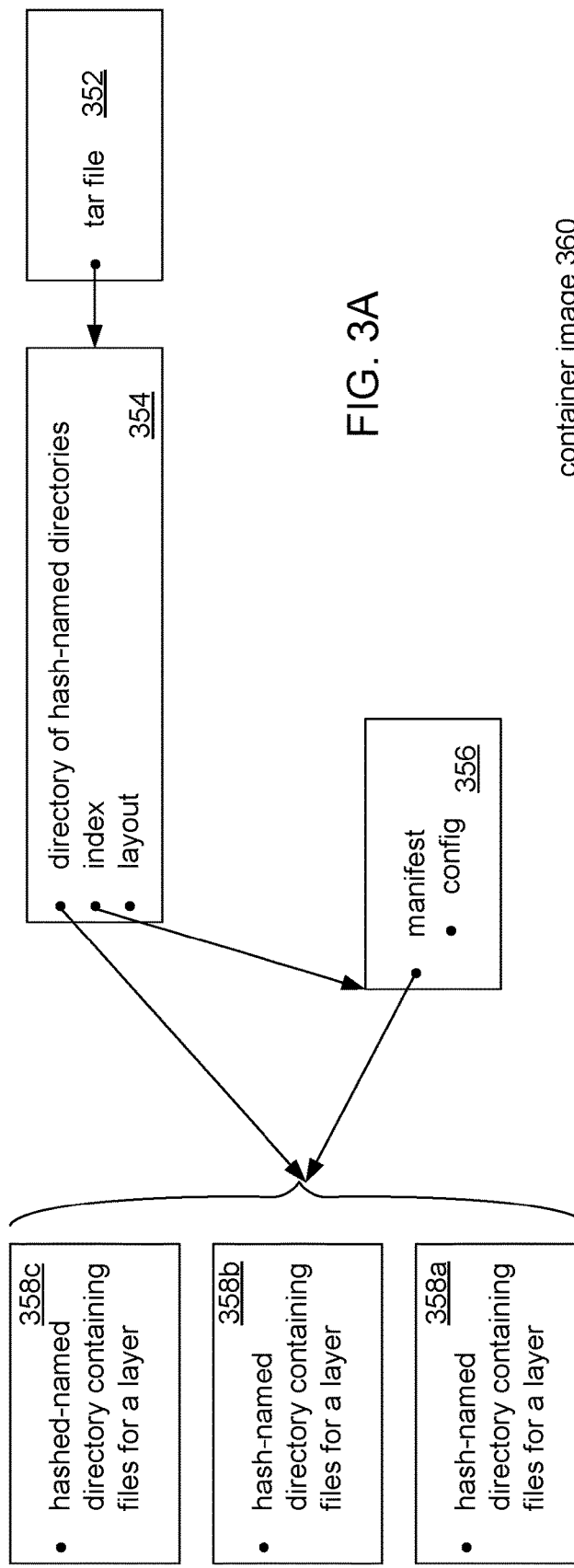
FIG. 3A depicts the structure of a container image in a repository.

FIG. 3A depicts the structure of a container image in a repository. As shown, a delivery file, such as tar file 352, contains a structure 354 that includes a directory of hash-named directories, an index, and a layout. Each hash-named directory 358a-c contains files, sometimes called image digest files, for a particular layer of the image. Accordingly, an image digest file corresponds to a layer of the container image. The hash-named directories 358a-c permit content-addressable access to the files of the layers. The index in structure 354 contains at least one manifest 356, which points to the hash-named directories 358a-c containing the files of the layers and configuration information labeled config, which is used to create the runtime bundle.

Figure 3B:
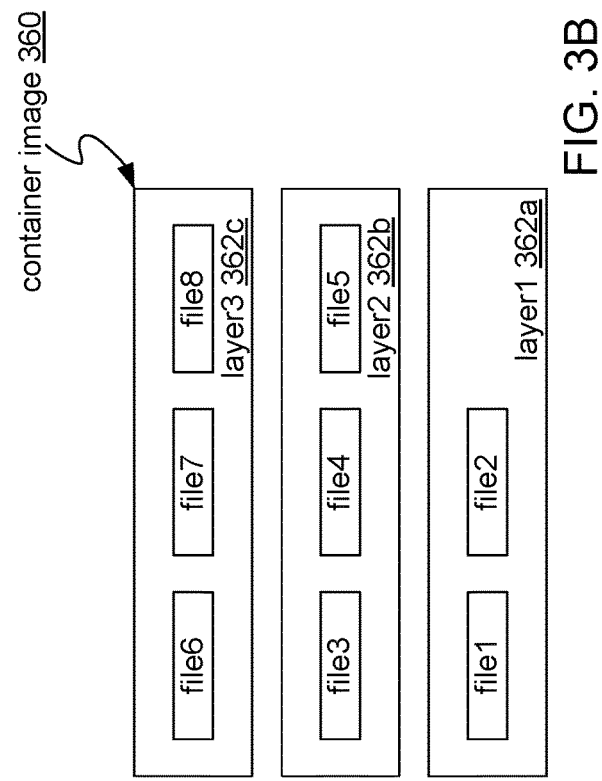
FIG. 3B depicts the structure of a container image.

FIG. 3B depicts the structure of a container image. As shown, a container image 360 is the combination of read-only layers, starting with layer 1 (the base layer) 362a and then adding the upper read-only layer 2 362b and upper read-only layer 3 362c, one on top of the other, to form the container image 360. Each layer includes one or more files. When the layers are combined, a file in a higher layer may overwrite a file in a lower layer if the higher layer file updates a file in the lower layer.

Figure 3C:
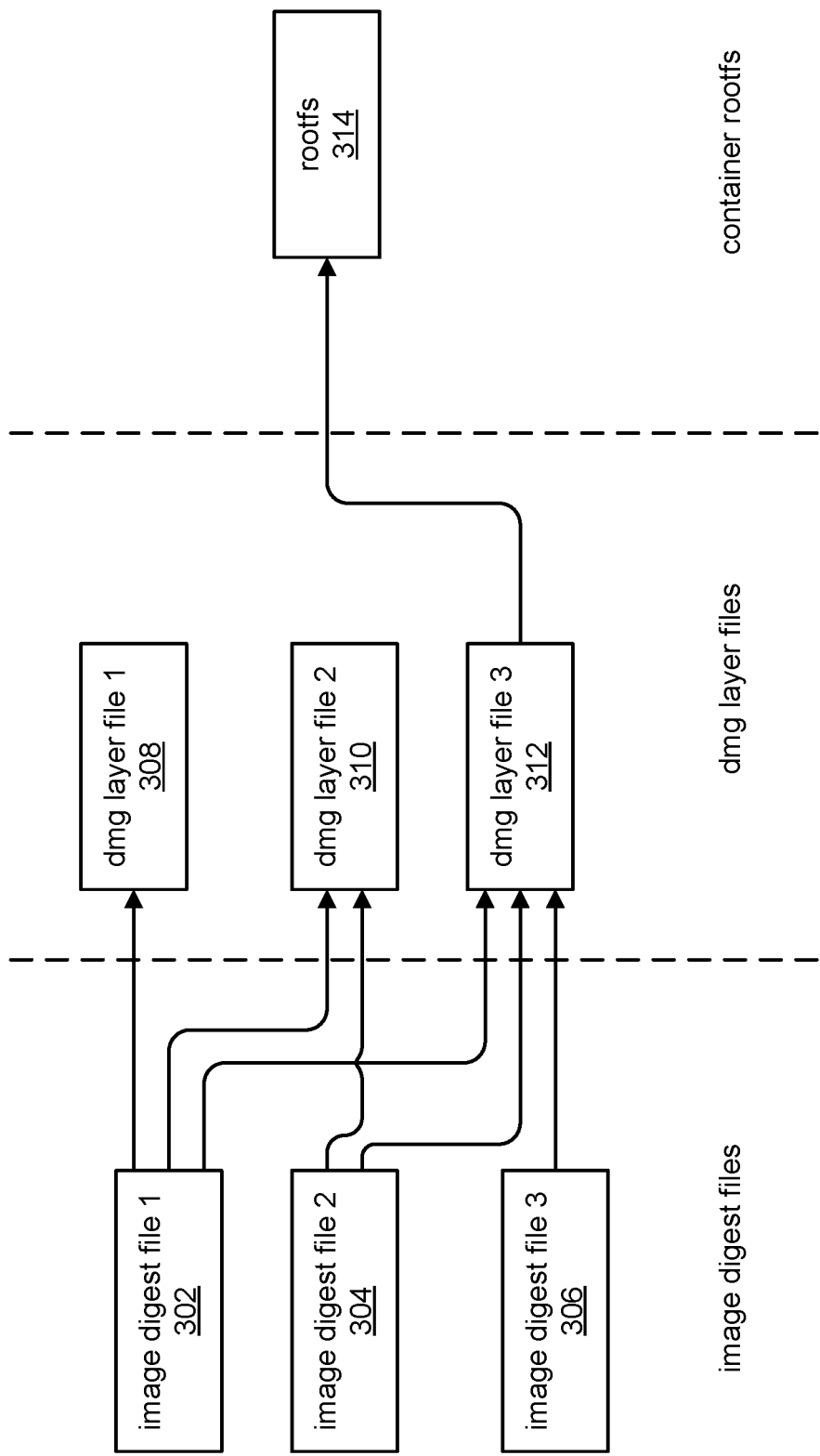
FIG. 3C depicts the construction of a container image.

FIG. 3C depicts the construction of a container image. Three dmg layer files are depicted in the figure. The first dmg layer file is dmg layer file 1 308 and comprises (e.g., files of) image digest file 1 302, which is the base layer of the container image. Dmg layer file 2 310 comprises the union of image digest file 2 304, which is a difference layer of the container image and image digest file 1 302. Dmg layer file 3 312 comprises the union of image digest file 1 302, image digest file 2 304, and image digest file 3 306 (another difference layer of the container image), which is then presented as a unified file system (rootfs) 314 to the container.

Figure 4A:
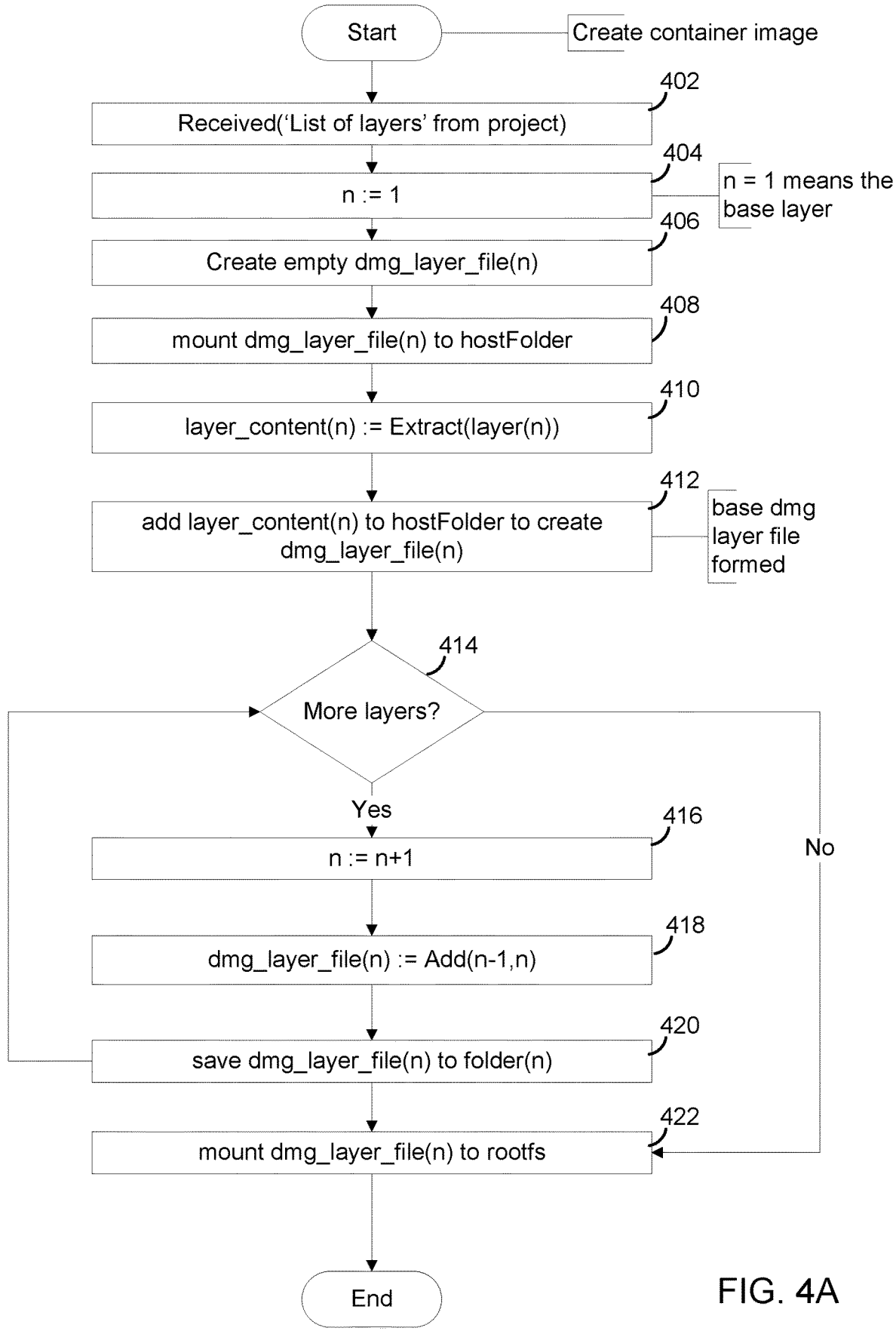
FIG. 4A depicts a flow of operations of a function for creating a container image, according to FIG. 3C, in an embodiment.

FIG. 4A depicts a flow of operations of a function for creating a container image according to FIG. 3C, in an embodiment. In step 402, the function receives a list of layers (e.g., digest files) for the container. In step 404, the function initializes a variable n that indicates the layer number. In step 406, the function creates an empty dmg_layer_file(n) (i.e., a dmg layer file). If n=1, then the empty dmg_layer_file is for the base layer of the container image. The step of creating the dmg_layer_file, in one aspect, performs the command, hdiutil create—fs 'Case-sensitive HFS+'—size 100 m—volname layer path, so that the dmg_layer_file has a case-sensitive name. In step 408, the function mounts the dmg_layer_file(n) to a host folder. The step of mounting the dmg_layer_file, in one aspect, performs the command, hdiutil mount path—mountpoint mountpoint-path. In step 410, the function extracts from layer(n) the contents (e.g., files), layer_content(n), of the layer. In certain embodiments, the layer contents are the contents of a digest file stored in one of the hashed-named directories 358a-c, as depicted in FIG. 3A. In step 412, the function adds the layer_content(n) to the host folder which creates the dmg_layer_file(n). Thus, when n=1, the dmg_layer_file(1) includes the contents of the base layer of the container image. In step 414, the function determines whether or not there are more layers needed to create the container image. If so, then the function increments the layer number n in step 416 and, in step 418, calls Add(n−1, n) to add the dmg_layer_file(n−1) to the content of the next layer n to create the dmg_layer_file(n). In step 420, the function optionally saves the dmg_layer_file(n) to a folder so that it can be used as an intermediate result (possibly for other containers), and it can also be used if another layer needs to be added. If, as determined in step 414, there are no more layers, then in step 422, the function mounts the dmg_layer_file(n) to the root file system for the container. Thus, the function saves one or more (e.g., all, a subset, those after dmg layer file 2, etc.) of the intermediate dmg layer files it creates so that they are available for other containers. For example, if there are three layers in the container image, dmg layer files 1 (having contents of layer 1), 2 (having contents of layers 1 and 2), and 3 (having contents of layers 1, 2, and 3) are all available to be used or reused. For example, dmg_layer_file(1) is available in the host folder, dmg_layer_file(2) is available in folder2, and dmg_layer_file(3) is available in folder3.

Figure 4B:
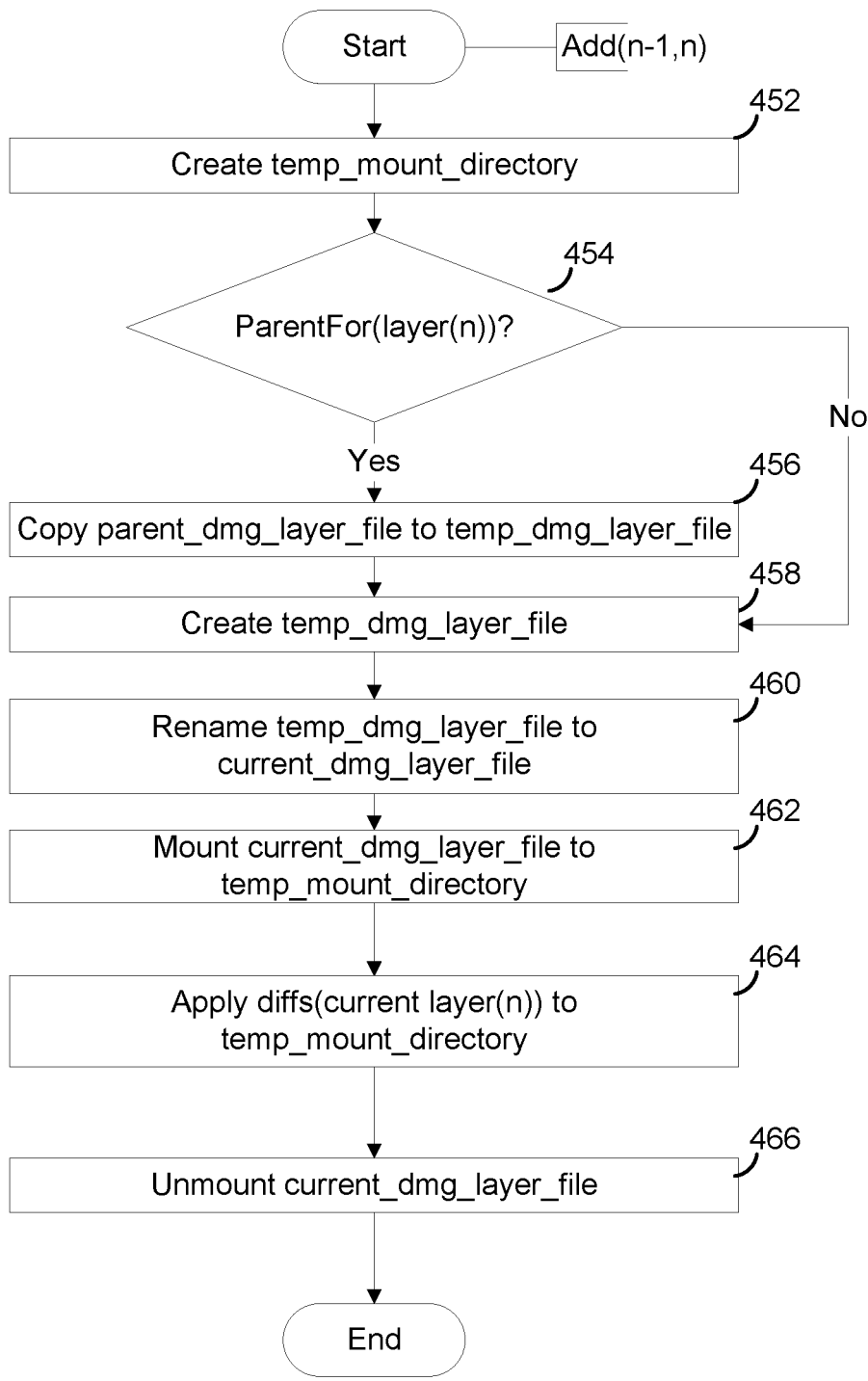
FIG. 4B depicts a flow of operations of a function for adding files of a layer to a disk image file, in an embodiment.

FIG. 4B depicts a flow of operations for adding files of a layer to a disk image file, in an embodiment. The disk image file creation function adds files of a layer to either an existing dmg layer file or to a empty dmg layer file. In step 452, the function creates a temporary mount directory, temp_mount_directory. In step 454, the function determines if there is a parent layer (layer n−1) for the layer n (the current_snapshot). If there is a parent layer, the parent dmg layer file corresponding to the parent layer is copied in step 456 to a temp_dmg_layer_file. Thus, the temp_dmg_layer_file includes the same contents as the parent dmg_layer_file. If there is no parent dmg_layer_file, then an empty temp_dmg_layer_file is created in step 458. In step 460, the temp_dmg_layer_file is renamed to the current dmg_layer_file (e.g., having an ID of the current layer). In step 462, the current dmg_layer_file is mounted to the temp_mount_directory. In step 464, the function adds (e.g., the differences of) the current layer n to the temp_mount_directory, so that the temp_mount_directory now contains the contents of layer n, and if there was a parent layer also the contents of layer n−1 and any previous layers. In step 466, the dmg_layer_file in the temp_mount_directory is un-mounted from the temp_mount_directory and is now available as a dmg layer file that can be used for the current container and possibly other containers. Step 466, in one aspect, performs the command, hdiutil detach mountpointpath.

Figure 5:
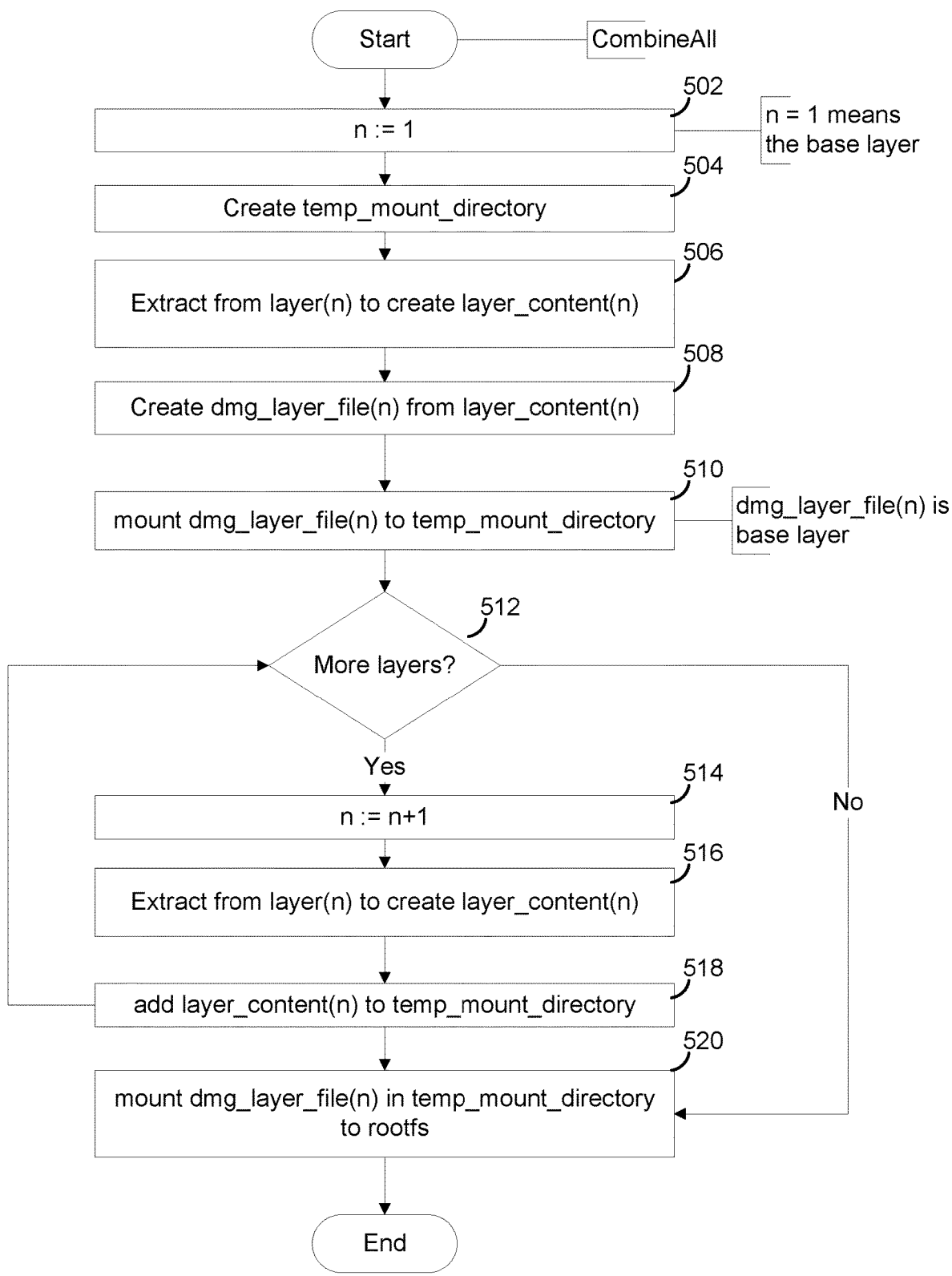
FIG. 5 depicts a flow of operations for combining all files of all layers of a container image in a directory, in an embodiment.

FIG. 5 depicts a flow of operations for combining all files of all layers of a container image in a directory, in an alternate embodiment. In this alternate embodiment, all of the files of all layers are accumulated in the temp_mount_directory to generate a single final dmg layer file, and individual dmg layer files are not available for other use. In step 502, the layer counter is initialized to 1. In step 504, the function creates the temp_mount_directory. In step 506, the function extracts from layer(n) contents to create layer_content(n). In step 508, the function creates a dmg_layer_file(n)

from the layer_content(n). In step 510, the function mounts the dmg_layer_file(n) to the temp_mount_directory. Thus, if n=1, the temp_mount_directory contains the base layer of the container image. In step 512, the function determines whether or not there are more layers. If so, then in step 514, the function increments the layer counter and, in step 516, extracts from layer(n) content for layer_content(n). In step 518, the function adds the layer_content(n) to the temp_mount_directory. At this point, the temp_mount_directory contains the combination of files of layer 1 and layer 2 of the container image. The function goes back to step 512 to determine if there are more layers. If so, the function adds the content of the next layer to the content of the temp_mount_directory. If not, then the function mounts the dmg_layer_file(n) in the temp_mount_directory to the root file system of the container. Thus, in this embodiment, all of the image files are accumulated in the temp_mount_directory, and no intermediate dmg_layer_files are stored.

Figure 6:
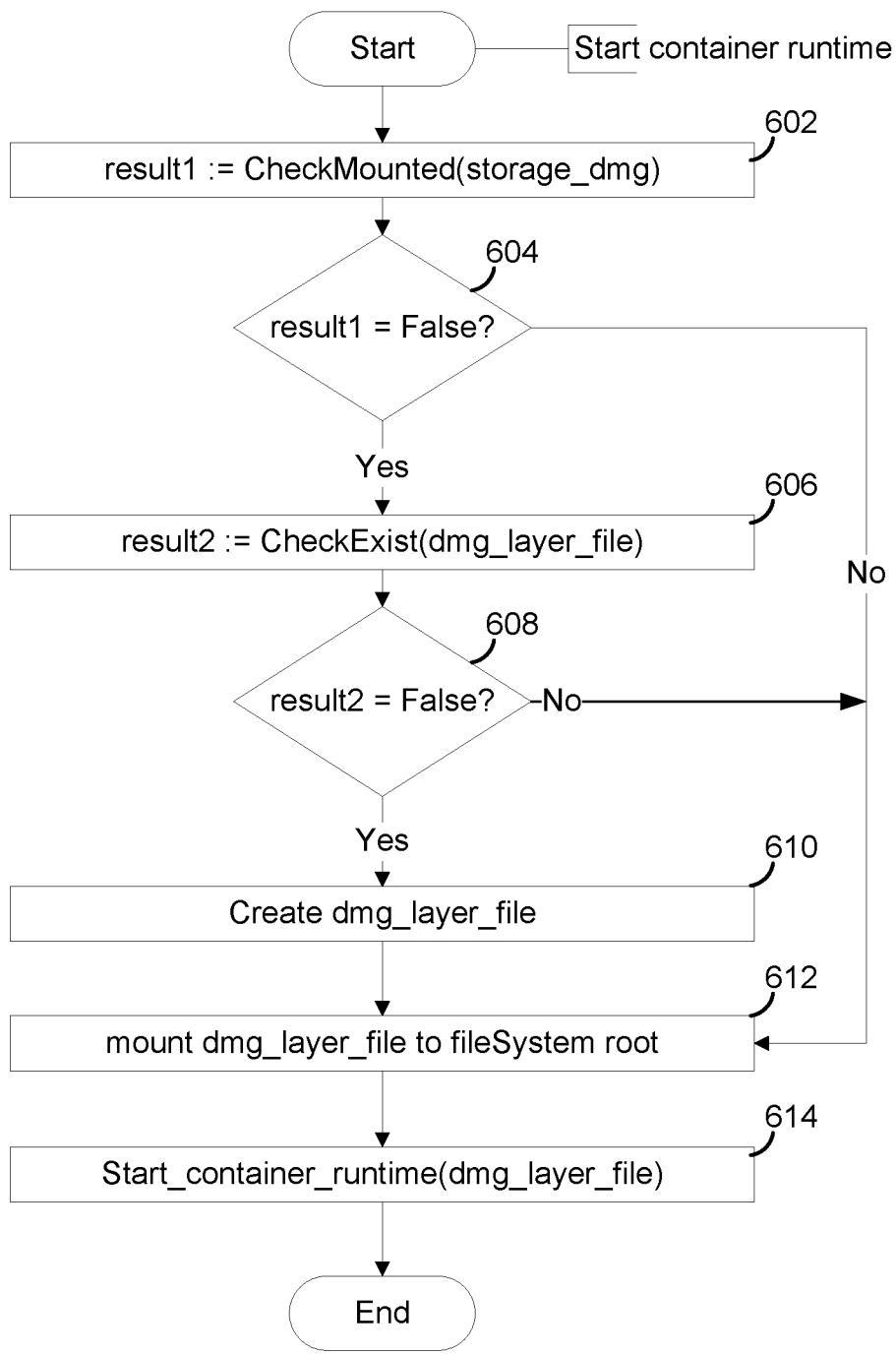
FIG. 6 depicts a flow of operation for starting a container runtime, in an embodiment.

FIG. 6 depicts a flow of operation of a function for starting a container runtime, in an embodiment. In step 602, the function checks to see if a dmg_layer_file is mounted in storage. If not, as determined in step 604, the function checks, in step 606, to see if a dmg_layer_file exists. If not, as determined in step 608, the function creates a dmg_layer_file for the container in step 610, using either the operations of FIG. 4A, 4B, or FIG. 5. In step 612, the function mounts the dmg_layer_file to the file system root, and in step 614, the function performs start container runtime to start the container runtime using the dmg_layer_file.

Figure 7:
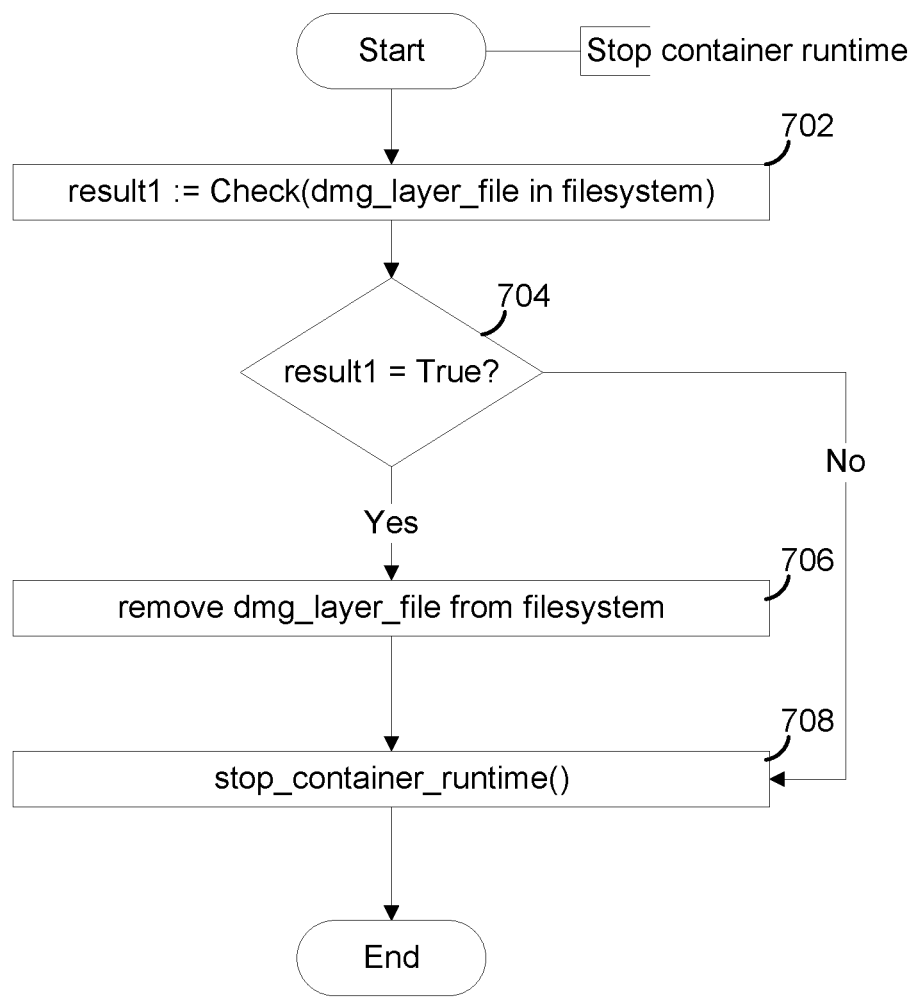
FIG. 7 depicts a flow of operations for stopping a container runtime, in an embodiment.

FIG. 7 depicts a flow of operations of a function for stopping a container runtime, in an embodiment. In step 702, the function checks the file system for the dmg_layer_file. If, as determined in step 704, the dmg_layer_file is in the file system, then the function removes the dmg_layer_file from the file system in step 706 and in step 708 performs stop_container_runtime to stop the container.

Thus, by creating case-sensitive dmg files from the layers and accumulating them into a final image, a container image file can be built without using a union operation of the native file system.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer-readable media. The term computer-readable medium refers to any data storage device that can store data which can thereafter be input to a computer system—computer-readable media may be based on any existing or subsequently developed technology for embodying computer programs in a manner that enables them to be read by a computer. Examples of a computer-readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer-readable medium can also be distributed over a network coupled computer system so that the computer-readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system level virtualization, wherein an abstraction layer is provided on top of the kernel of an operating system on a host computer. The abstraction layer supports multiple OS-less containers, each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method for forming a container image, the method comprising:
   obtaining a first layer of a plurality of layers of the container image;
   storing contents of the first layer into a directory, wherein a first disk image layer file is mounted to the directory;
   obtaining a second layer of the plurality of layers;
   storing contents of the second layer into the directory so that the first disk image layer file includes the contents of the first layer and the second layer;
   setting a property of the first disk image layer file to configure the first disk image layer file to have case sensitive file names; and
   saving the first disk image layer file, the first disk image layer file being mountable and including files of the container image.

2. The method of claim 1, wherein the second layer is a difference layer over at least the first layer.

3. The method of claim 1, further comprising:
   prior to storing contents of the second layer into the directory, un-mounting the first disk image layer file from the directory; and
   saving a copy of the first disk image layer file in a second directory.

4. The method of claim 1,
   wherein the first layer and second layer correspond to first and second digest files in a repository; and
   wherein each of the first digest file and second digest file has a hash value and is accessible from the repository by its hash value.

5. The method of claim 1, further comprising executing a container based on the container image, the container having a root file system, by mounting the first disk image layer file to the root file system.

6. The method of claim 5,
   wherein the method is performed by a container runtime executing on a host operating system of a computing device; and
   wherein the container is running in a virtual computing instance executing on the computing device, the container virtualizing a guest operating system of the virtual computing instance.

7. A system comprising:
   one or more processors; and
   a RAM containing a host operating system and a program run by the one or more processors for forming a container image, wherein the program is configured to perform steps for forming a container image, the steps including:
   obtaining a first layer of a plurality of layers of the container image;
   storing contents of the first layer into a directory, wherein a first disk image layer file is mounted to the directory;
   obtaining a second layer of the plurality of layers;
   storing contents of the second layer into the directory so that the first disk image layer file includes the contents of the first layer and the second layer;
   setting a property of the first disk image layer file to configure the first disk image layer file to have case sensitive file names; and
   saving the first disk image layer file, the first disk image layer file being mountable and including files of the container image.

8. The system of claim 7, wherein the second layer is a difference layer over at least the first layer.

9. The system of claim 7, wherein the steps further include:
   prior to storing contents of the second layer into the directory, un-mounting the first disk image layer file from the directory; and
   saving a copy of the first disk image layer file in a second directory.

10. The system of claim 7,
    wherein the first layer and second layer correspond to first and second digest files in a repository; and
    wherein each of the first digest file and second digest file has a hash value and is accessible from the repository by its hash value.

11. The system of claim 7, wherein the steps further include executing a container based on the container image, the container having a root file system, by mounting the first disk image layer file to the root file system.

12. The system of claim 11,
    wherein the method is performed by a container runtime executing on the host operating system; and
    wherein the container is running in a virtual computing instance executing on the system, the container virtualizing a guest operating system of the virtual computing instance.

13. A non-transient computer-readable medium containing instructions executable in a computer system, where the instructions when executed in the computer system cause the computer system to carry out a method for forming a container image, the method comprising:
    obtaining a first layer of a plurality of layers of the container image;
    storing contents of the first layer into a directory, wherein a first disk image layer file is mounted to the directory;
    obtaining a second layer of the plurality of layers;
    storing contents of the second layer into the directory so that the first disk image layer file includes the contents of the first layer and the second layer;
    setting a property of the first disk image layer file to configure the first disk image layer file to have case sensitive file names; and saving the first disk image layer file, the first disk image layer file being mountable and including files of the container image.

14. The non-transient computer-readable medium of claim 13, wherein the second layer is a difference layer over at least the first layer.

15. The non-transient computer-readable medium of claim 13, the method further comprising:
 prior to storing contents of the second layer into the directory, un-mounting the first disk image layer file from the directory; and
 saving a copy of the first disk image layer file in a second directory.

16. The non-transient computer-readable medium of claim 13,
 wherein the first layer and second layer correspond to first and second digest files in a repository; and
 wherein each of the first digest file and second digest file has a hash value and is accessible from the repository by its hash value.

17. The non-transient computer-readable medium of claim 13, the method further comprising executing a container based on the container image, the container having a root file system, by mounting the first disk image layer file to the root file system.

* * * * *